No. 634,963. Patented Oct. 17, 1899.
E. J. SMITH.
STREET SWEEPER.
(Application filed Mar. 26, 1898.)
(No Model.) 2 Sheets—Sheet 1.
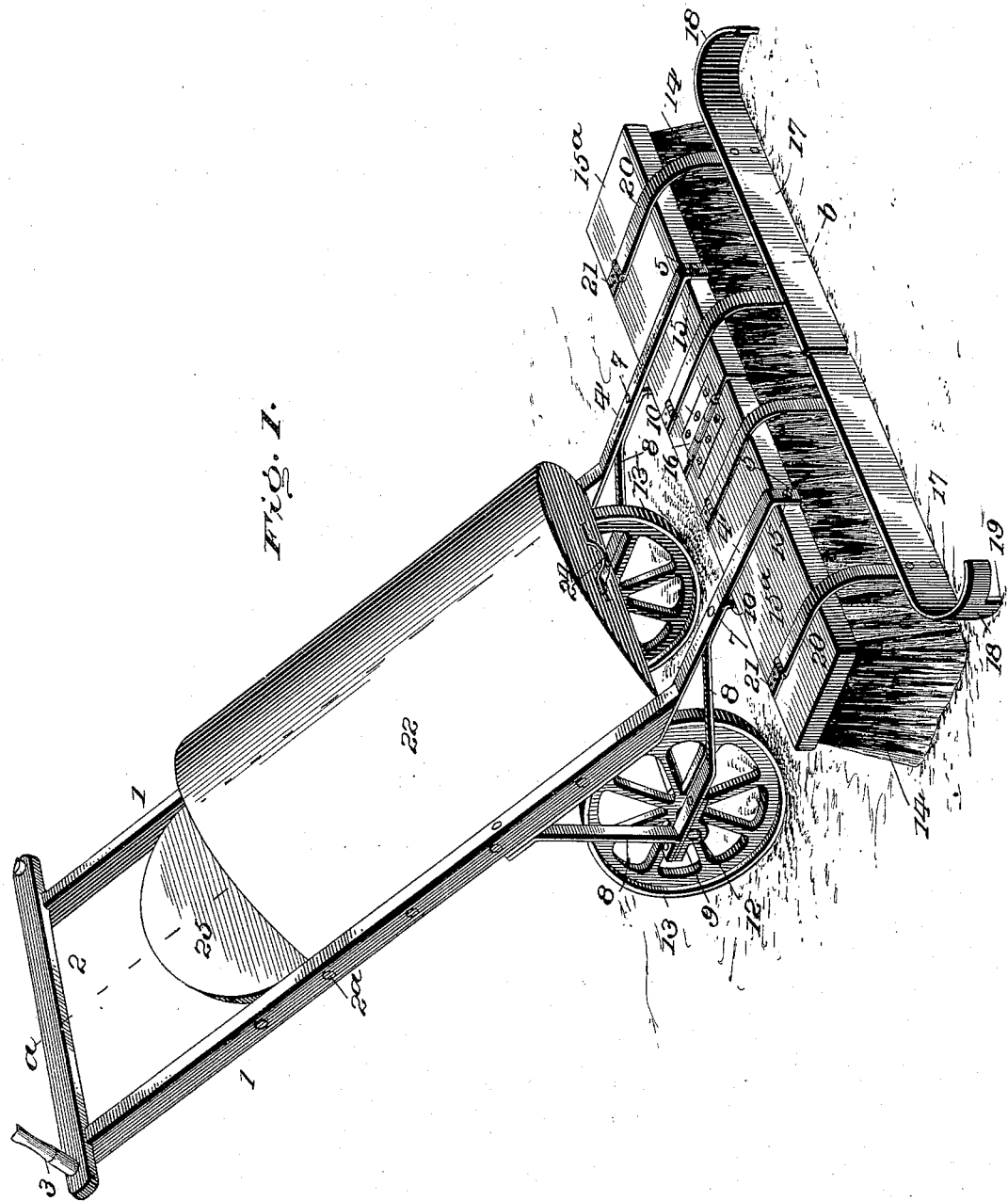

No. 634,963. Patented Oct. 17, 1899.
E. J. SMITH.
STREET SWEEPER.
(Application filed Mar. 26, 1898.)
(No Model.) 2 Sheets—Sheet 2.
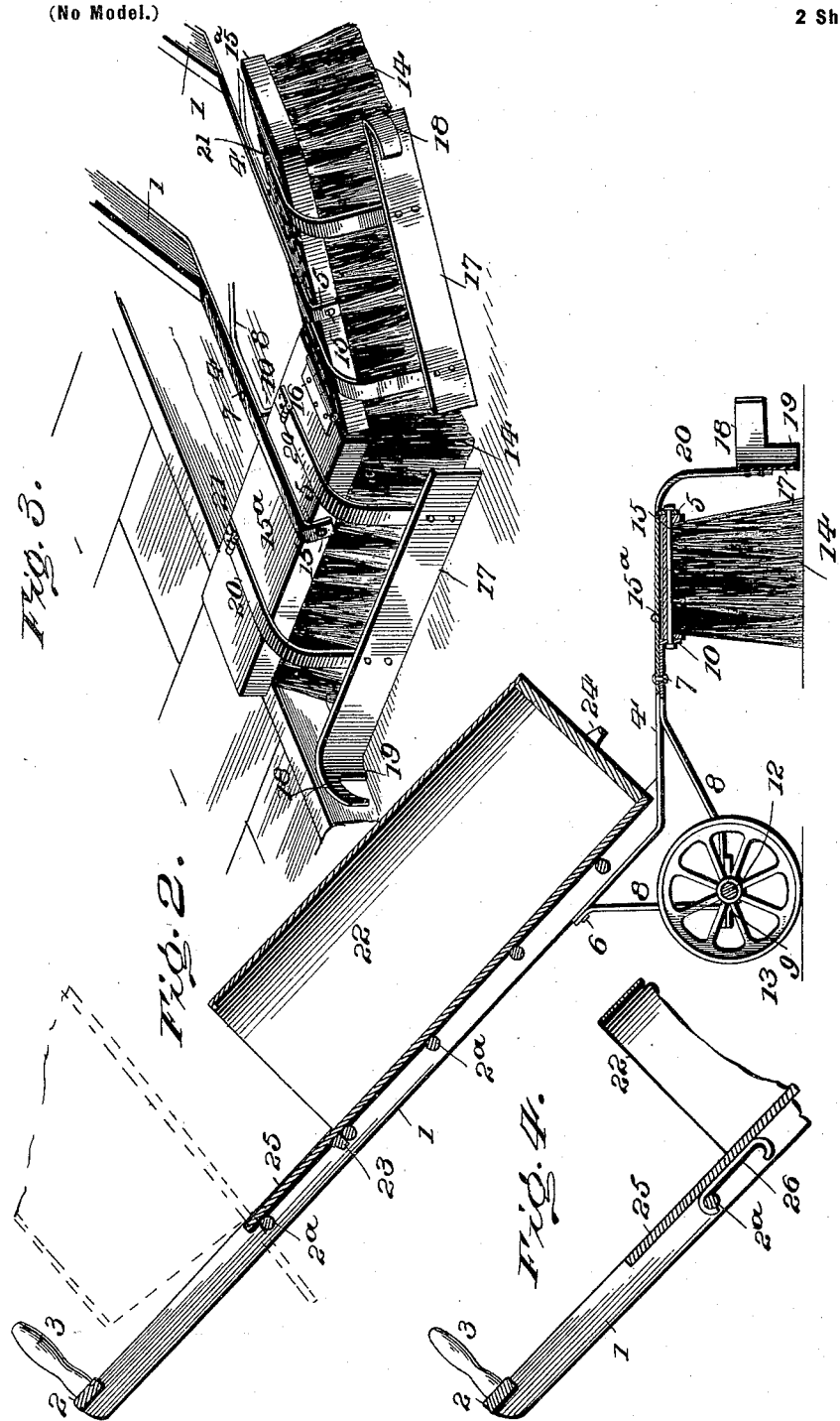

UNITED STATES PATENT OFFICE.

ELDRIDGE J. SMITH, OF WASHINGTON, DISTRICT OF COLUMBIA.

STREET-SWEEPER.

SPECIFICATION forming part of Letters Patent No. 634,963, dated October 17, 1899.

Application filed March 26, 1898. Serial No. 675,279. (No model.)

*To all whom it may concern:*

Be it known that I, ELDRIDGE J. SMITH, a citizen of the United States, residing at Washington, in the District of Columbia, have invented certain new and useful Improvements in Portable Street-Sweeping Brooms; and I do hereby declare the following to be a full, clear, and exact description of the invention, such as will enable others skilled in the art to which it appertains to make and use the same.

My present invention relates to an improved portable hand-propelled street-sweeping broom; and the invention has for its objects to provide a simple and durable device of this character and one that will be easy and effective in its operation and cheap to manufacture.

It is the purpose of this invention to provide a portable sweeping-broom that can be easily operated or propelled by a single person and which will adapt itself to any undulations or uneven places in the roadway or pavement.

It is another purpose of my invention to provide a street-sweeping machine or broom especially adapted for cleaning gutters and having a yielding guide or runner and a plow attached thereto to guide the broom in its course and keep the brush-heads out of direct contact with the curb.

It is a further purpose of the invention to provide a sweeping-broom having a scraping blade or plow attached thereto and operating in front of the brushes, so as to aid in the operation and efficiency of the device, and, finally, the invention contemplates the employment and use of a dirt receiver or receptacle which is movably mounted upon the frame of the broom in such manner that it can be easily and readily dumped of its contents without removing the same from its place of support.

I am aware that I am not the first one to provide a hand-propelled sweeping-broom mounted upon wheels, and I do not lay claim to such a device broadly, my invention being distinguished from devices of this nature in that the brushes are pivotally attached to the frame for a purpose hereinafter to be described, and by preference two or more brushes are used instead of one.

Briefly stated, the invention comprises a suitable frame mounted upon wheels and having brushes pivotally mounted at the front of the frame, so as to swing freely upon their pivots, whereby they may be accommodated to any undulations or uneven places in the road-bed or pavement, and in providing a sweeper or broom of this type with scraper-blades hinged or loosely connected to the brushes in such manner as to carry the bulk of the dirt, said blades being normally out of contact with the road-bed, but provision being made whereby they may be thrown directly in contact therewith, as the nature and requirements of the work may demand.

To these and other ends the invention comprises the novel features of construction and new arrangements of parts hereinafter described and then more definitely pointed out in the claims which conclude this specification.

In order to enable others to understand, make, and use my said invention, I will proceed to describe the same in detail, reference being had for this purpose to the accompanying drawings, in which—

Figure 1 is a perspective view of a complete machine constructed in accordance with the provisions of this invention. Fig. 2 is a longitudinal sectional view of the same, taken on the broken line *a b* of Fig. 1. Fig. 3 is a detail perspective view showing one of the brushes operating against the curb and the other brush in a raised position. Fig. 4 is a detailed sectional view of a modified arrangement of holding-clip for the dirt-receptacle.

Referring now to the drawings, I will first describe the frame of the machine, which comprises two side pieces 1, connected at the top by a cross-bar 2, provided with handles 3, and along their length with cross-rods $2^a$, as clearly shown in Figs. 1 and 2, these parts of the frame being preferably made of wood. To the under side of each side piece 1, at the lower end thereof, is secured a metal strip, preferably of band-steel, which strips form extensions 4, projecting outward from the frame at an obtuse angle and each having its free end bent downward to form a lip 5 for a purpose presently to appear. Bolted to each metal strip upon each side of the frame at the points 6 and 7 is a depending bracket 8, provided with a journal-bearing 9, and the forward end of each bracket is bent downward to provide a lip 10, which lips are located behind and in alinement with the lips 5 on the extensions 4. A shaft 12 is journaled in the bearings 9, and wheels 13 are freely mounted upon said shaft, all as clearly shown in the drawings. This construction and arrangement of parts provides a simple and durable frame, and by making the extension 4 of band-steel a yielding support for the brushes is provided, which is a great advantage in machines of this type, as will be obvious.

The reference-numerals 14 designate the brushes, of which by preference I use two, although I do not wish to be understood as limiting myself to this number, as more may be employed, if desired, without departing from the spirit of my invention. These brushes are each pivotally mounted upon the frame by means of bolts or rods 15, which pass entirely through the brush-heads 15$^a$ and have their ends secured to the lips 5 and 10, respectively, as will be seen. In practice I connect the brushes together at their abutting ends by means of a hinge 16. It will be seen that by pivotally mounting the brushes to the frame they always rest squarely upon the surface being cleaned and are free to rock and move upon their supports, so as to readily accommodate themselves to any undulations or uneven places in the pavement or road-bed, and likewise by forming the brush in two sections the machine may be tilted up at one side, as shown in Fig. 3, to enable it to pass over obstructions, if any should appear, while at the same time leaving one section of the brush free to perform its work. This construction also affords other important advantages not possible with a brush made in one section, and, furthermore, the pivotal mounting of the brushes allows them to be readily removed and reversed when worn upon one side.

Attached to and operating in front of each brush is an adjustable blade or scraper 17, each having its outer end bent or curved outward and then inward to form a guide 18 and their lower extremities below the guide cut away to form a so-called "plow-point" 19, which when operating in gutters serves to scrape the dirt or mud from the corner or angle formed by the curb and pavement, while the guide 18 acts to keep the brush-head from contact with the curbstone. The scrapers are connected to the brushes by means of metal bands 20, which are hinged to the top of the brush-heads at 21, as will be seen. In operation these scrapers plow out the dirt where packed down in the gutter or pavement and carry a greater proportion of the debris, thereby relieving the brushes of the heavy work. Furthermore, it will be seen that the scrapers act independent of and do not interfere with the operation of the brushes, for the reason that they automatically adjust themselves to whatever pressure is placed upon the brushes, so that at all times the pressure of the scrapers upon the ground is governed by their own weight, owing to the fact that they are hinged to the brush-heads, and in their normal position they are slightly elevated from the ground, as will be seen by referring to Fig. 2.

In devices of this kind it is desirable to provide some means for carrying or conveying the dirt gathered by the broom, and for this purpose I have provided a box or receptacle 22, which is made to rest upon the cross-rods 2$^a$ and to fit between the sides 1 of the frame, in which position it will aid in balancing the machine. To the under side of the box or receptacle I attach a transverse strip or cleat 23, Fig. 2, which normally rests upon one of the cross-rods 2$^a$ and holds the box in position upon the frame. When it is desired to dump the dirt from the receptacle, it is simply necessary to grasp the handle 24 and push the receptacle upward upon the frame until the cleat 23 strikes the upper cross-rod 2$^a$ and then bring the same to the position shown in dotted lines in Fig. 2 and the sweepings will fall out upon the ground or into a bag, if such be provided. The bottom of the box or receptacle is preferably provided with an extension 25 at the upper open end which aids in discharging or conveying the dirt into the bag.

In Fig. 4 of the drawings I have shown a modified form of device for holding and retaining the receptacle upon the frame. This device consists of a double hook 26, attached to the under side of the box, one at either side thereof. The dumping operation with the double hook is practically the same as with the cleat; but the hook construction is thought to be preferable in that the box or receptacle is not likely to become accidentally displaced with the use thereof.

A machine constructed in accordance with the provisions of this specification will be light and durable in construction and easy and effective in operation, and since it is mounted upon wheels it can be readily moved from place to place with little exertion.

Minor changes and additions may be made without departing from the spirit of my invention.

What I claim is—

1. In a portable sweeping-broom, the combination with a wheeled frame, of broom-supporting brackets carried by said frame, and brooms arranged end to end and freely mounted upon said brackets so as to rock laterally thereon the adjacent ends of said brooms being hinged together.

2. In a portable sweeping-broom, the combination with a wheeled frame, of rigid broom-supporting brackets carried by said frame and projecting outward in front of the wheels, and brushes pivoted intermediate their ends to said brackets so as to have a free lateral rocking movement in their supports.

3. In a street-sweeping broom, the combination with a wheeled frame, of a pair of brackets projecting outward in front of said frame, a brush pivoted intermediate its ends to each bracket, and a loose connection between said brushes.

4. In a street-sweeping broom, the combination with a wheeled frame, of a pair of brackets projecting outward in front of said frame and each provided with a pair of downward-extending lips, a rod or bolt carried by each pair of lips, and a brush freely mounted upon each rod or bolt.

5. In a street-sweeping broom, the combination with a wheeled frame, of a brush mounted upon said frame, and a scraping-blade arranged in front of the brush and having a hinged connection with the head of the latter so as to move independent thereof.

6. In a street-sweeping machine the combination with a wheeled frame of brackets or supports projecting outward in front of said frame, brushes freely mounted in said brackets or supports, and scraping-blades hinged to said brushes and lying in front of the latter.

7. In a street-sweeping broom, the combination with a suitable frame, of a brush mounted upon said frame, a scraping-blade arranged in front of said brush and having one of its ends extending beyond the edge of the brush and bent or curved to form a side guide, as and for the purpose specified.

8. In a street-sweeping broom, the combination with a suitable frame, of brackets or supports projecting outward in front of said frame, brushes pivotally mounted in said brackets or supports and a scraping-blade hinged to the top of each brush, and each blade having its outer end bent outward and then inward to form a guide, substantially as described.

9. In a street-sweeping broom, the combination with a suitable frame comprising the inclined side standards and separated, connecting cross-rods, of a removable box or receptacle slidably mounted upon the frame so as to be adjustably supported thereon and normally resting upon the cross-rods, and a cleat or projection upon the under side of the box or receptacle, one side of said cleat being arranged to engage one of the cross-rods to support the receptacle in position for loading and the opposite side arranged to engage another cross-rod to retain the receptacle in position for dumping, substantially as described.

In testimony whereof I affix my signature in presence of two witnesses.

ELDRIDGE J. SMITH.

Witnesses:
J. GRANVILLE MEYERS, Jr.,
ALEX. ELLIOTT, Jr.